United States Patent
Schaad et al.

(10) Patent No.: US 10,711,750 B2
(45) Date of Patent: Jul. 14, 2020

(54) VALVE FOR METERING A FLUID

(71) Applicant: Robert Bosch GmbH, Stuttgart (DE)

(72) Inventors: Andreas Schaad, Maulbronn (DE); Joerg Abel, Gerlingen (DE); Juergen Maier, Ottmarsheim (DE); Martin Buehner, Backnang (DE); Matthias Boee, Ludwigsburg (DE); Olaf Schoenrock, Schwieberdingen (DE); Philipp Rogler, Stuttgart (DE); Stefan Cerny, Bietigheim-Bissingen (DE)

(73) Assignee: Robert Bosch GmbH, Stuttgart (DE)

( * ) Notice: Subject to any disclaimer, the term of this patent is extended or adjusted under 35 U.S.C. 154(b) by 0 days.

(21) Appl. No.: 16/304,732

(22) PCT Filed: Jun. 21, 2017

(86) PCT No.: PCT/EP2017/065269
§ 371 (c)(1),
(2) Date: Nov. 27, 2018

(87) PCT Pub. No.: WO2018/001829
PCT Pub. Date: Jan. 4, 2018

(65) Prior Publication Data
US 2019/0219014 A1 Jul. 18, 2019

(30) Foreign Application Priority Data

Jun. 30, 2016 (DE) .................. 10 2016 211 904
Apr. 28, 2017 (DE) .................. 10 2017 207 273

(51) Int. Cl.
*F02M 51/06* (2006.01)
*F02M 63/00* (2006.01)
(Continued)

(52) U.S. Cl.
CPC ......... *F02M 51/0653* (2013.01); *B05B 1/302* (2013.01); *F02M 51/0625* (2013.01);
(Continued)

(58) Field of Classification Search
CPC ........... F02M 51/0653; F02M 51/0685; F02M 63/0022; F02M 61/042; F02M 63/0075;
(Continued)

(56) References Cited

U.S. PATENT DOCUMENTS 6,367,769 B1 * 4/2002 Reiter ................ F02M 51/0671
239/585.5
6,520,434 B1 * 2/2003 Reiter ................ F02M 51/0685
239/533.11
(Continued)

FOREIGN PATENT DOCUMENTS

DE        10345967 A1    4/2005
DE    102004037250 A1    2/2006
(Continued)

OTHER PUBLICATIONS

International Search Report for PCT/EP2017/065269, dated Sep. 20, 2017.

Primary Examiner — John Bastianelli
(74) Attorney, Agent, or Firm — Norton Rose Fullbright US LLP; Gerard Messina

(57) ABSTRACT

A valve for metering a fluid. An armature of the electromagnetic actuator is movable along a longitudinal axis of a valve needle, the movement of the armature relative to the valve needle being limited by a stop surface on the valve needle. The armature has a passage channel. The stop surface is on a stop element. The stop element and the armature are such that during operation there always remains an intermediate space, adjoining the valve needle, between the stop element and an end face of the armature (Continued)

facing the stop element. The stop surface lies, in a contact region, on the end surface of the armature facing the stop element when the armature and the stop surface come into contact during operation, the contact region being situated between the intermediate space and an opening of the passage channel when the armature and the stop surface come into contact.

9 Claims, 3 Drawing Sheets

(51) Int. Cl.
F02M 61/04 (2006.01)
F16K 31/06 (2006.01)
B05B 1/30 (2006.01)

(52) U.S. Cl.
CPC ...... *F02M 51/0685* (2013.01); *F02M 61/042* (2013.01); *F02M 63/0022* (2013.01); *F02M 63/0075* (2013.01); *F16K 31/0651* (2013.01); *F16K 31/0696* (2013.01); *F02M 2200/304* (2013.01)

(58) Field of Classification Search
CPC .......... F02M 51/0625; F02M 2200/304; B05B 1/302; F16K 31/0651; F16K 31/0696
USPC ............ 251/129.15, 129.21, 129.18, 129.19; 239/585.1, 585.5
See application file for complete search history.

(56) References Cited

U.S. PATENT DOCUMENTS

| | | | |
|---|---|---|---|
| 6,742,726 B2* | 6/2004 | Reiter | ................ F02M 51/0685 239/533.2 |
| 2015/0247479 A1* | 9/2015 | Maeurer | .............. F02M 51/066 239/585.2 |

FOREIGN PATENT DOCUMENTS

| | | |
|---|---|---|
| EP | 2634413 A1 | 9/2013 |
| EP | 3009663 A1 | 4/2016 |
| JP | 2005518497 A | 6/2005 |
| JP | 2017096313 A | 6/2017 |
| WO | 02068811 A1 | 9/2002 |
| WO | 2014048609 A1 | 4/2014 |

\* cited by examiner

VALVE FOR METERING A FLUID

BACKGROUND INFORMATION

The present invention relates to a valve for metering a fluid, used in particular as a fuel injection valve for internal combustion engines. Specifically, the present invention relates to the area of injectors for fuel injection systems of motor vehicles, in which, preferably, a direct injection of fuel into combustion chambers of an internal combustion engine takes place.

German Patent Application No. DE 103 45 967 A1 describes a fuel injection valve for fuel injection systems of motor vehicles is known. The fuel injection valve includes a magnetic coil and an armature that can be moved by the magnetic coil in a stroke direction against a reset spring. The armature is situated movably on the valve needle, between a first flange that is connected to the valve needle and that limits the movement of the armature in the stroke direction and a second flange connected to the valve needle. Between the armature and the second flange there is provided a spring that, in a rest state of the fuel injection valve, exerts force on the armature such that it is situated at a distance from a stop surface of the second flange, forming a free path for the armature. Here it was already recognized that the use of a spring realized as a spiral spring instead of a plate spring is advantageous because a plate spring hinders the compensation of the fuel situated between the armature, armature stop, and spring, which can cause congestion and an uncontrolled hydraulic behavior of the fuel in the area of the armature.

SUMMARY

The valve according to the present invention may have the advantage that an improved design and functioning are enabled. In particular, the dynamic behavior during opening and closing of the valve can be improved. Specifically, undesirable hydraulic effects, such as hydraulic adhesion and/or undesired mechanical effects, such as armature bouncing, can be prevented or at least reduced.

Through the measures described herein, advantageous developments of the valve are possible.

The armature is preferably situated in an inner space of the valve that is filled at least during operation with a liquid fluid. In a preferred embodiment, this liquid fluid is the fluid metered by the valve. In an embodiment of the valve as a fuel injection valve, this can therefore be a liquid fuel.

If, in such an embodiment, in the initial state or also during an actuation cycle a flat end face of the armature comes into flat contact with a flat stop surface, as is the case in a conventional embodiment, then due to the hydraulic medium, i.e., the liquid fluid, a hydraulic adhesion effect occurs when the armature is removed from the stop surface. This is caused in particular because the liquid fluid first has to flow into the narrow gap that arises. Conversely, in a conventional embodiment, when the armature approaches the stop surface there is a hydraulic damping, because the liquid fluid has to be impelled out of the gap, which is becoming ever narrower. During an actuation cycle, these two effects occur alternately at the respective stop surfaces. This results in a damping effect, and in particular a delay with regard to the dynamic behavior during the controlling of the valve. On the other hand, in the conventional embodiment, in this way armature bouncing is reduced during closing.

In accordance with the present invention, in the valve, which may be correspondingly further developed, the overlapping of one or more passage channels of the armature, and a stiffness of the one or both stops for the armature, can be optimized such that an optimal combination is achieved of hydraulic damping during closing of the valve and a preferably low hydraulic adhesion of the armature on the relevant stop surface during opening, relative to the respective embodiment of the valve.

A further development in accordance with the present invention may have the advantage that on the one hand an advantageous flow through the passage channels is enabled, and on the other hand a fluid exchange is advantageously ensured between the intermediate space and the inner space. In this way, in particular in an operating state in which the armature is detached from the stop surface, a hydraulic adhesive effect can be set to be sufficiently small. Here, this process is facilitated in particular by subsequent flowing of fluid from the inner space into the passage channel in the area of its opening. On the other hand, an advantageous pressure buildup can nonetheless take place in the intermediate space when the armature meets the stop surface and there is elastic deformation of the stop element.

Another development in accordance with the present invention may advantageously enable a fluid exchange between the intermediate space and the inner space from the inside to the outside or from the outside to the inside via the passage channel and the outer partial surface formed outside the edge when the armature and the stop surface come into contact at the projection plane.

The stop surface has an outer edge that runs once around the longitudinal axis of the valve needle. In principle, a passage opening, in particular a passage bore, can also be fashioned on the stop element on which the stop surface is fashioned, and in this way an edge situated inside the stop surface, in particular a circular edge, can be formed. Depending on the configuration, shape, and number of passage channels, the stop surface can be suitably realized to enable a flow of the fluid with regard to the individual passage channels. For example, a plurality of passage channels can be provided of which some are situated closer to the longitudinal axis of the valve needle and some others are situated further away from the longitudinal axis of the valve needle. If the relevant stop surface is to be made correspondingly large, then the proposed solution can be realized both for the passage channels situated further inward and for those situated further outward. Here, in particular for the passage channels situated further inward, inner passage openings having corresponding inner edges can be realized in order to ensure the stability of the stop surface. Here, a further development in accordance with the present invention may have the advantage that the configuration of the at least one relevant passage channel, in particular its distance from the longitudinal axis, and the dimensioning of the stop surface, in particular a radius of the edge of the stop surface from the longitudinal axis, can be calibrated to one another in such a way that the proposed solution can be realized without associated passage openings on the stop element on which the stop surface is fashioned.

The relevant stop surface is fashioned on a stop element. Here, an embodiment corresponding to another development in accordance with the present invention is particularly advantageous. It will be understood that here it would also be possible to provide two stop elements, of which for example one is fashioned on the valve needle and the other is connected to the valve needle in order to join a one-piece armature having a central passage bore to the valve needle, and subsequently to limit it in its movement between the stop elements. However, an embodiment having two stop elements fashioned on the valve needle is also possible if for example a segmented armature is used. In addition, the proposed embodiment of the stop surface can be realized on only one of the stop surfaces, on both stop surfaces in the same manner, or on both stop surfaces in different ways. Here, adaptations to the respective case of application, in particular the desired valve dynamic characteristic and the required bounce characteristic when closing the valve, are possible. In particular, in order to achieve a desired capability for multiple injection, for which a plurality of injections have to be capable of being realized during an injection cycle, it may be necessary to avoid bounce as far as possible.

With the realization of the valve in accordance with the present invention, a damping characteristic during the movement limiting can be reinforced. Here, when the armature impacts the stop element an excess pressure in the intermediate space can be produced, or when the armature bounces back a partial vacuum can be produced in the intermediate space, resulting in a particularly effective reduction of possible bouncing of the armature. In particular, in this way a rapid calming of the armature relative to its initial position when the valve is closed can be achieved in order to achieve multiple injection capability even given short pause times between the individual injections in an injection cycle.

Another development in accordance with the present invention may have the advantage that the intermediate space can be realized by a beveling, seen in profile, on the stop element. Here, an advantageous development in accordance with the present is possible.

In a further advantageous embodiment, the intermediate space can be set at least partly above the height of a step between the stop surface and a preferably partial annular surface on the stop element, with regard to its volume. Here it is in addition advantageous that the surface of the stop element limiting the intermediate space and the stop surface are made parallel to one another and are both oriented perpendicular to the longitudinal axis, the step being situated between the surface and the stop surface and a beveled area or the like thus being omitted. Inter alia, this embodiment has the advantage that good measurability is enabled of the parallelity of the stop surface to the preferably circular annular surface that limits the intermediate space. In the context of series production, in this way process setting, process monitoring, and, if warranted, quality control are possible. In particular, in series production it can be specified as a tolerance specification that a slight conicity is permissible. A slight conicity can be defined in that, with regard to the throttle gap formed between the contact region and the end face of the armature facing the stop element, an adequate throttle effect is ensured when the armature and the stop surface come into contact during operation, so that when the armature stops on the stop surface there is immediately a buildup of an adequately large pressure in the intermediate space to realize the proposed hydraulic damping.

Specifically, through the realization of the surface limiting the intermediate space as a circular annular surface, a development in accordance with the present invention can be realized.

A development in accordance with the present invention can be realized in particular in that the end face of the armature facing the stop surface is made flat and is oriented so that the longitudinal axis of the valve needle passes through the end face of the armature in perpendicular fashion. This can be realized in combination with a stop surface that is flat and oriented perpendicular to the longitudinal axis.

A development in accordance with the present invention may have the advantage that on the one hand, if warranted, a throttle effect can be realized relating to the inner partial surface, while on the other hand a flow through the passage channel, required as a rule in order to accelerate the armature, is not too strongly throttled by a correspondingly large outer partial surface precisely when the armature detaches from the stop surface. Specifically, for the calibration of the dynamic characteristic and/or to avoid bounce by producing a corresponding hydraulic effect, the inner partial surface and the contact region can also be chosen to be small if warranted, while an outer partial surface that is as large as possible enables the flow through the armature in the desired manner.

BRIEF DESCRIPTION OF THE DRAWINGS

Preferred exemplary embodiments of the present invention are explained in more detail below with reference to the figures, in which corresponding elements are provided with matching reference characters.

DETAILED DESCRIPTION OF EXAMPLE EMBODIMENTS

Figure 1:
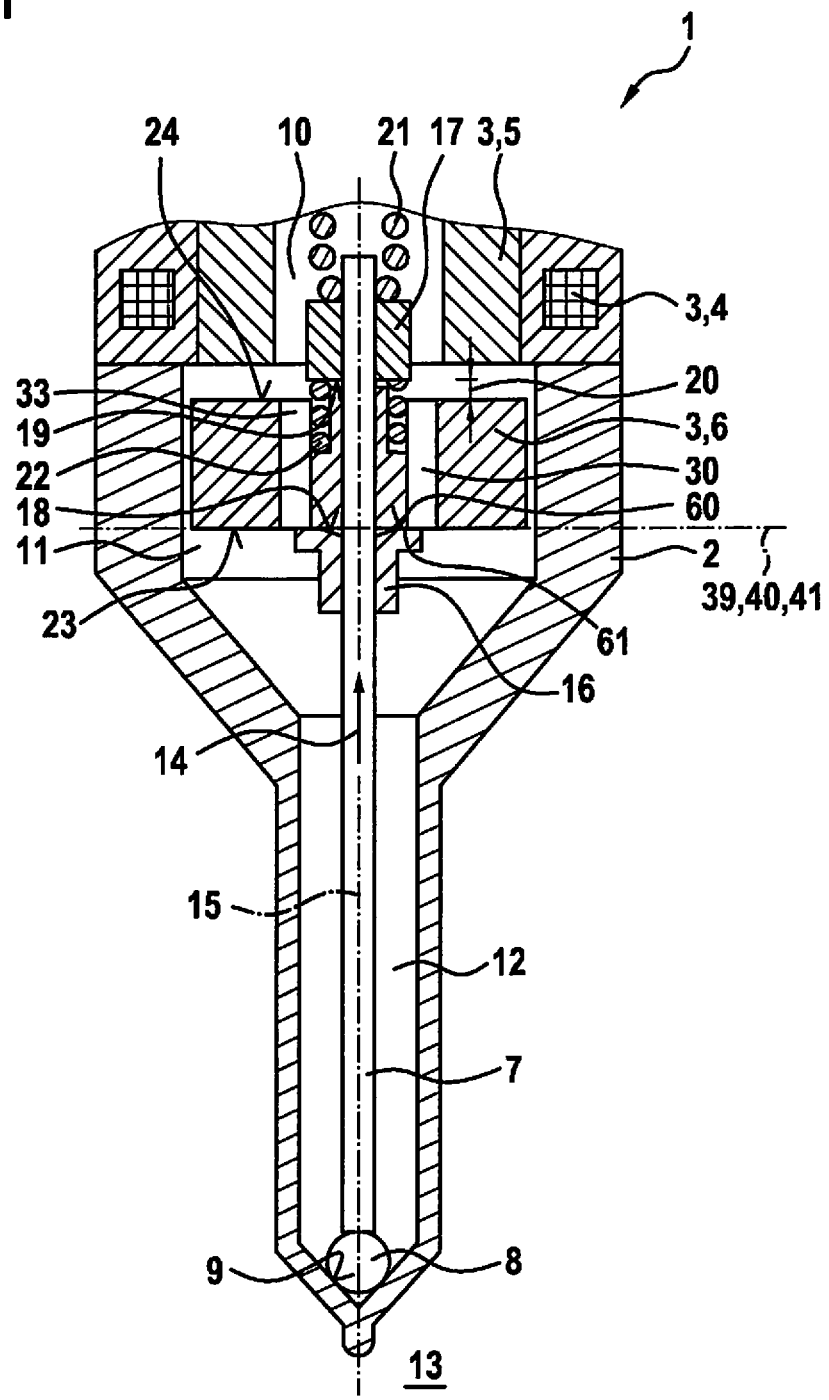
FIG. 1 shows a valve in a partial schematic sectional representation, corresponding to an exemplary embodiment of the present invention.

FIG. 1 shows a valve 1 for metering a fluid in a partial schematic sectional representation corresponding to an exemplary embodiment. Valve 1 can be realized in particular as fuel injection valve 1. A preferred application is a fuel injection system, in which such fuel injection valves 1 are fashioned as high-pressure injection valves 1 and are used for the direct injection of fuel into allocated combustion chambers of the internal combustion engine. Here, liquid or gaseous fuels may be used as fuel.

Valve 1 has a multipart valve housing 2, an electromagnetic actuator 3 that includes a magnetic coil 4, an inner pole 5, and an armature 6, and a valve needle 7 that can be actuated by electromagnetic actuator 3, which needle actuates, during operation, a valve closing body 8 connected to valve needle 7 in order to open a sealing seat formed between valve closing body 8 and a valve seat surface 9. Here, fuel is conducted via an axial bore 10 of inner pole 5 into an interspace 11 of valve housing 2 and is conducted out from inner space 11 via an annular gap 12 to the sealing seat, so that when the sealing seat is open fuel can be injected into a space 13, in particular a combustion chamber 13, via nozzle openings.

In this exemplary embodiment, valve 1 is realized as inward-opening valve 1, and valve needle 7 is displaced in an opening direction 14 along a longitudinal axis 15 in order to open valve 1.

Armature 6 of actuator 3 is mounted in flying fashion on valve needle 7, so that a movement of armature 6 along longitudinal axis 15 is possible in opening direction 14 and opposite this direction. With regard to valve needle 7, this movement is limited by stop elements 16, 17. Here, stop elements 16, 17 can each be connected to valve needle 7 or made on valve needle 7.

In this exemplary embodiment, stop element 16 is fashioned as stop sleeve 16, fixedly connected to valve needle 7. In addition, in this exemplary embodiment stop element 17 is fashioned as stop ring 17, also connected fixedly to valve needle 7. Such fixed connections can be realized for example by welding. On stop elements 16, 17, stop surfaces 18, 19 are fashioned that face one another and between which armature 6 is displaceable corresponding to a specified armature free path 20.

In addition, a reset spring 21 is provided that in this exemplary embodiment moves valve needle 7, via stop element 17, opposite opening direction 14 in order to displace valve needle 7 into its initial position in which the sealing seat is closed. In addition, a spring 22 is provided that moves armature 6 into its initial position, in which armature 6 lies with its end face 23 on stop surface 18. In this initial position, armature free path 20 results between end surface 24 of armature 6, which faces away from a surface 23, and stop surface 19.

When there is an actuation of valve 1, current flows through magnetic coil 4, so that armature 6 is accelerated in opening direction 14 due to the acting magnetic force. Here, valve needle 7 remains in its initial position until armature 6 comes into contact with its end surface 24 on stop surface 19 of stop element 17. The acceleration of armature 6 here enables a larger opening impulse for the displacement of valve needle 7. The movement of armature 6 is then limited by stopping on inner pole 5 relative to valve housing 2. Here, there can still be a certain degree of continued oscillation of valve needle 7.

To close valve 1, magnetic coil 4 is switched currentless, so that via reset spring 21 a resetting of valve needle 7 takes place opposite opening direction 14, and armature 6 is carried along by stop element 17. When valve closing body 8 falls into its seat, then the further resetting of armature 6 into the initial position shown in FIG. 1 takes place, spring 22 ensuring the initial position.

In this exemplary embodiment, inner space 11 is filled with liquid fuel. Here, passage channels 30 through 35 formed in armature 6 enable fuel to be conducted from bore 10 in the direction toward annular gap 12. In addition, fuel can also flow past armature 6, between armature 6 and valve housing 2.

When there is an actuation process, the liquid fuel is first impelled between end face 24 of armature 6 and stop surface 19 of stop element 7. Subsequently, there must take place a detaching of armature 6 with its end face 24 from stop surface 19 of stop element 17. In addition, when valve 1 is closed there is an impelling of the liquid fuel between stop surface 18 of stop element 16 and end face 23 of armature 6. Also particularly important, at the beginning of the actuation process, is the detaching of armature 6 from stop element 16, in which liquid fuel has to flow in between end face 23 of armature 6 and stop surface 18 of stop element 16. In order to ensure an advantageous hydraulic characteristic, a particular design is proposed at stop surface 18 of stop element 16 and/or at stop surface 19 of stop element 17. Here it will be understood that the design described in the following on the basis of stop element 16 and armature 6 can also be realized, alternatively or in addition, relating to stop element 17.

Figure 2:
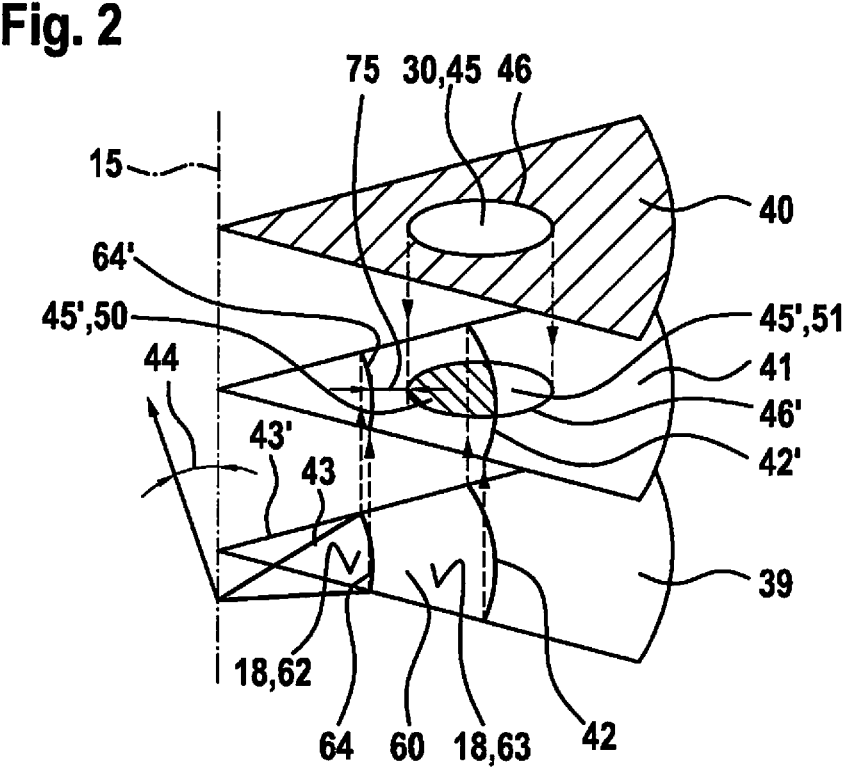
FIG. 2 shows a partial schematic representation explaining the design of the valve shown in FIG. 1, in an exploded view.

FIG. 2 shows a partial schematic representation explaining the embodiment of valve 1 shown in FIG. 1, in an exploded view. For the simplification of the representation, here only one longitudinal axis 15 of the valve needle 7 is shown in order to illustrate the position of valve needle 7. In addition, planes 39, 40, 41 are shown, through each of which longitudinal axis 15 passes in perpendicular fashion. Planes 39 through 41 are here each represented by a pie-slice segment of a circle whose midpoint lies on longitudinal axis 15. Here, plane 41 is the plane of projection at which stop element 16 and armature 6 come into contact when there is a suitable position of valve 1. Plane 40 is characterized in that end face 23 of armature 6 is situated in it. However, the realization of armature 6 is not necessarily limited to one in which end face 23 of armature 6 lies in plane 40 and longitudinal axis 15 thus passes through it in perpendicular fashion. In particular, it is conceivable for end face 23 also to have recesses or raised areas in some regions, starting from a flat shape.

Plane 39 is characterized in that seating region 60 and an edge 42 of stop surface 18 of stop element 16 are situated in it. In this exemplary embodiment, edge 42 is fashioned as edge 42 having the shape of a circular line; in FIG. 2, a circular line segment of edge 42 is shown. Here, in a part 62, i.e. partially, stop surface 18 is realized corresponding to the surface 62 of a cone. In addition, stop surface 18 is made flat and oriented perpendicular to longitudinal axis 15 in a part 63 in which a seating region 61 is situated. If for example a surface line 43 is regarded that runs in surface 62 from an edge 64 in a straight line to longitudinal axis 15, then a non-disappearing angle of inclination 44 is defined. This angle of inclination 44 results as follows. The projection of surface line 43 parallel to longitudinal axis 15 into plane 39 is a radius 43'. Angle of inclination 44 now results from the right triangle having surface line 43 as hypotenuse and radius 43' as adjacent leg relative to angle of inclination 44. Edge 64 is here an edge 64 in the shape of a circular line that limits seating region 60 inwardly, seen radially.

In a modified embodiment, the non-disappearing angle of inclination 44 can also vary along edge 42. In this exemplary embodiment, angle of inclination 44 is however constant along edge 42, because stop surface 18 results partly from surface 62 of a cone.

Edge 42 is projected into projection plane 41 along longitudinal axis 15, i.e., parallel to longitudinal axis 15. In this way, projection 42' of edge 42 results.

In this exemplary embodiment, an opening 45 of passage channel 30 lies in plane 40. Opening 45 is realized as circular opening 45 in this exemplary embodiment. Opening 45 is thus limited by a closed line 46 that in this exemplary embodiment is realized as a circular line 46. Opening 45, or circular line 46, are projected into projection plane 41 along longitudinal axis 15. In this way, in projection plane 41 there results a projection 45' of opening 45, or a projection 46' of circular line 46.

Valve 1 is now realized, corresponding to the proposed solution, such that projection 42' of edge 42 of stop surface 18 into projection plane 41, which plane longitudinal axis 15 passes through in perpendicular fashion and at which armature 6 and stop surface 18 come into contact, runs through projection 45' of opening 45, facing stop surface 18, of passage channel 30 into projection plane 41. Through projection 42' of edge 42 into projection plane 41, projection 45' of opening 45 into projection plane 41 is divided into an inner partial surface 50 and an outer partial surface 51. In addition, a projection 64' of edge 64 in projection plane 41 is situated, regarded radially, at a distance of radial minimum length 75 from projection 46' of circular line 46, or of projection 45' of opening 45, projection 64' of edge 64 being situated closer to longitudinal axis 15 than projection 46' or projection 45'.

It is to be noted that a projection into projection plane 41 is always to be understood such that the projection takes place in perpendicular fashion into projection plane 41. Because longitudinal axis 15 passes through projection plane 41 in perpendicular fashion, this means that the projections always take place along, or parallel to, longitudinal axis 15. However, here it will also be understood that tolerances, a desired degree of play between armature 6 and valve needle 7, and similar influences caused by tolerances or by the construction, can cause deviations from an idealized construction or projection in the concrete realization of valve 1. For example, due to such influences, in particular a degree of play between armature 6 and valve needle 7, a family of curves can result for projection 46' of circular line 46 into projection plane 41 that includes circular lines offset radially somewhat to longitudinal axis 15 about idealized projection 46'. In addition, it will be understood that in any case, given a rotationally symmetrical realization of stop surface 18, relative rotations of armature 6 about longitudinal axis 15 relating to stop element 16 can be regarded as equivalent. If this is required in the specific individual case, a guiding of armature 6 along valve needle 7 may also be realized if warranted, which limits or prevents such relative rotations of armature 6.

Figure 3:
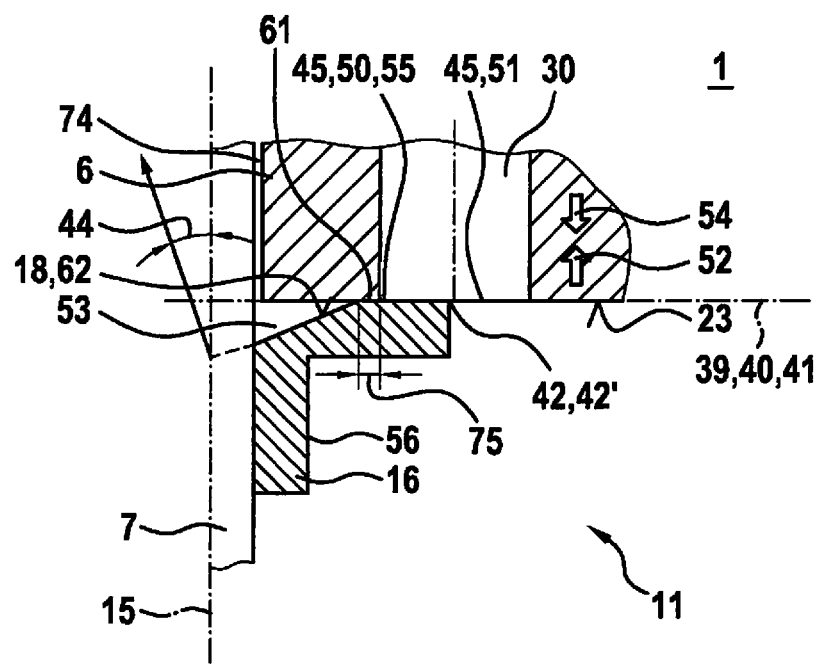
FIG. 3 shows a detail of the valve shown in FIG. 1.

FIG. 3 shows a detail of valve 1 shown in FIG. 1. Here a situation is shown as occurs on the one hand at the time of the beginning of an actuation of valve 1 when current is already flowing through magnetic coil 4. Here, a magnetic force is exerted in direction 52 on armature 6 that accelerates armature 6 in direction 52, or moves it from its initial position. On the other hand, what is concerned may be the time of an impact of armature 6 on stop element 16, as described further below.

In the initial position, planes 39 through 41, shown in FIG. 2, coincide, because armature 6 and stop surface 18 are in contact with each other.

Based on the described realization of stop surface 18, an intermediate space 53 is formed between part 62 of stop surface 18 and end face 23 of armature 6, which intermediate space is rotationally symmetrical relative to longitudinal axis 15 in this exemplary embodiment. Here, intermediate space 53 can first be regarded as partial space 53 separated from inner space 11 of valve 1, which in principle communicates hydraulically with inner space 11 only after armature 16 is detached from stop surface 18. When the movement of armature 6 in direction 52 takes place, intermediate space 53 becomes larger. This means that there is a tendency for the pressure in intermediate space 53 to decrease. This pressure drop is now compensated in that the liquid fluid flows in from inner space 11 via throttle gap 61, formed during the attachment. This means that a fluid exchange takes place from the outside to the inside through throttle gap 61, internal or inner partial surface 50, passage channel 30 in the area of its opening 45, and outer, or outwardly situated, partial surface 51. However, the hydraulic adhesive effect does not result, or results only slightly, at intermediate space 53. In this way, a detaching of armature 6 is facilitated already at the beginning of its movement in direction 52 from stop element 16. In this way a hydraulic adhesion is significantly reduced.

The detail of valve 1 shown in FIG. 3 also shows a second time in the actuation process at which armature 6 is guided in a direction 54 against stop element 16 during the closing of valve 1. When armature 6 approaches stop element 16, there results an impelling of the liquid fluid out of intermediate space 53, or there is a tendency for the pressure in intermediate space 53 to increase. As a result, the liquid fluid is impelled out of intermediate space 53, from the inside to the outside, through the formed throttle gap 61, inner partial surface 50, passage channel 30 in the area of its opening 45, and outer partial surface 51, into inner space 11. In this fluid exchange, there is a strongly throttled conducting of fuel via throttle gap 61 between contact region 16 and end face 23 of armature 6.

Regarded dynamically, during the closing of valve 1, or when armature 6 impacts in direction 54 against stop element 16, there is however also an elastic deformation of stop element 16. In this way, during the closing of valve 1 a rebounding of armature 6 on stop element 16 can be reduced.

Due to an elastic deformation of stop element 16 relative to contour 56 shown in FIG. 3, in part 62 there is a reduction of angle of inclination 44, so that intermediate space 53 between armature 6 and stop element 16 becomes smaller, and the fluid exchange from intermediate space 53 into inner space 11 from the inside to the outside is throttled via throttle gap 61, now acting as squeeze gap 61. This causes a correspondingly strong pressure increase in intermediate space 53. This causes uncompensated hydraulic forces opposite direction 54, acting on end face 23 on armature 6. In addition, elastic forces or spring forces act that, due to the elastic deformation of stop element 16, act on armature 6, guided on valve needle 7, opposite direction 54. Overall, over a certain region of movement of armature 6 this causes a damped braking of armature 6 in direction 54.

Here, valve 1 is preferably realized such that intermediate space 53 at no time completely disappears, i.e., liquid fluid is present in intermediate space 53 when armature 6 comes to a standstill relative to valve needle 7, and a reversal of movement of armature 6 takes place corresponding to the dynamic characteristic of the braking process.

In the actuation process, after the reversal of movement of armature 6, while valve 1 continues to be closed, when stop element 16 is moved back by spring force into the non-loaded position of stop element 16 illustrated by contour 56, an increase in the volume of intermediate space 53 is caused. This now causes a partial vacuum in intermediate space 53 relative to the pressure in inner space 11. In this way, there arises an uncompensated hydraulic force on armature 6 opposite direction 52. Because the resetting of stop element 16 into its non-loaded initial position causes a force on armature 6 in direction 52, the partial vacuum in intermediate space 53 dampens the movement of armature 6 after its reversal of movement. In this way, a rebounding of armature 6 is dampened. Corresponding to the removal of load on stop element 16, a fluid exchange into intermediate space 53 is enabled only via the strongly throttling throttle gap 61.

In this way, the spring-driven movement of armature 6 back in direction 52 is braked by the partial vacuum that arises in intermediate space 53. Depending on the realization of valve 1, further post-oscillations may occur. However, an advantageous damping is achieved, so that better calming of armature 6 results. In particular, in this way another opening of valve 1, through rebounding of armature 6 and a complete traversal of armature free space 20, can be avoided or completely prevented.

In addition, armature 6 can be calmed in a short time to such an extent that when there is a new actuation armature free space 20 is at least largely available as acceleration path for armature 6 in order to achieve a reliable opening of valve 1 via a sufficiently large movement impulse of armature 6. Thus, for example given a desired multiple injection capability, a short pause can be enabled between individual injections of an injection cycle.

In sum, in this exemplary embodiment on stop element 16 a contact region 60 is formed at which armature 6 lies with its end face 23 on stop surface 18 of stop element 16 in the initial state, stop element 16 being mechanically free of tension. This contact region 16 is here formed between intermediate space 53 and opening 45 of passage channel 30. As a result, at the beginning of the actuation of valve 1, in which armature 6 is accelerated in opening direction 14, a fluid exchange takes place only after armature 6 detaches from stop surface 18. Specifically during the closing of valve 1, at contact region 60 there is a strong throttle effect, such that liquid fluid has to flow through the narrow throttle gap 61, or squeeze gap 61, present at contact region 60 during the spring-driven motion in or out. The resulting pressure difference, in interaction with the application of the pressure in intermediate space 53 on armature 6 at its end face 23 and the non-compensated hydraulic force resulting therefrom, results in a braking or damping of armature 6 during the spring-driven motion both in and out.

Figure 4:
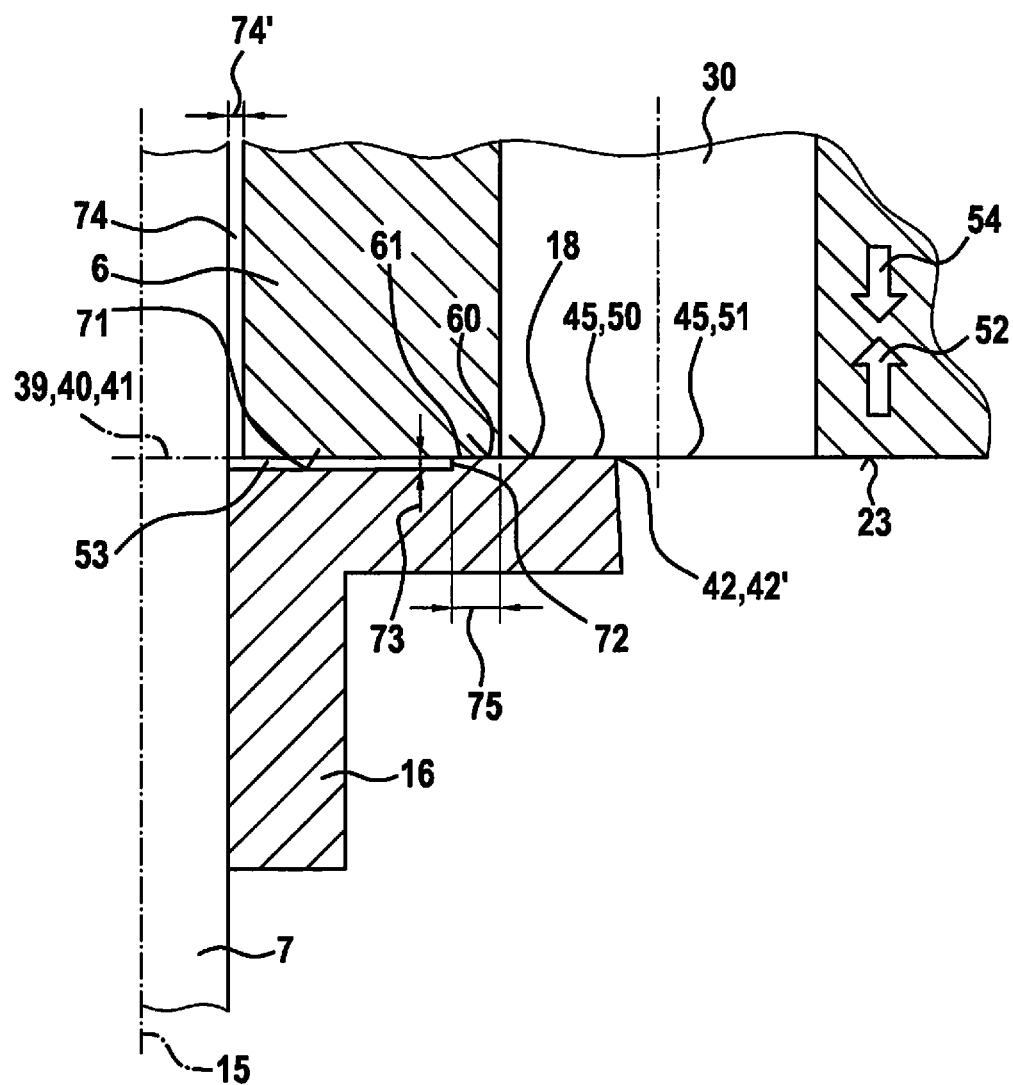
FIG. 4 shows the detail shown in FIG. 3 of the valve corresponding to a further exemplary embodiment.

FIG. 4 shows the detail shown in FIG. 3 of valve 1 corresponding to another exemplary embodiment. In this exemplary embodiment, a flat, circular annular surface 71 is formed on stop element 16, limiting intermediate space 53. In addition, a step 72 is provided that is situated between circular annular surface 71 and stop surface 18. Step 71 has a height 73. Via height 73, a volume of intermediate space 53 can be set in the non-loaded initial state of stop element 16.

Moreover, a guide gap 74 is provided between armature 6 and valve needle 7. In a possible embodiment, height 73 can for example be twice as large as a guide amount of play 74' determined by guide gap 74. For example, height 73 of step 72 can be 20 µm.

Circular annular surface 71 and stop surface 18 are preferably oriented perpendicular to longitudinal axis 15 of valve needle 7.

Through the specification of the radial minimum length 75, a calibration of the hydraulic or dynamic behavior during the controlling of valve 1 is possible. At the beginning of the actuation of armature 6, when this armature detaches from stop surface 18, fluid has to flow in between stop area 60 of stop surface 18 and end face 23 of armature 6. Here, a hydraulic adhesive effect acts until armature 6 has moved away from stop surface 18 somewhat in direction 52. The shorter the radial minimum length 75 is specified to be, the lower the hydraulic adhesive effect.

A further effect results when armature 6 impacts against stop element 6; first there is a formation of a throttle gap 61, in particular a squeeze gap 61. Here, the pressure in intermediate space 53 increases. The longer the radial minimum length 75 is specified to be, the greater the maximum pressure buildup in intermediate space 53 can tend to be. In this way, the maximum pressure that can be reached in intermediate space 53 can be set via the radial minimum length 75. Here care must also be taken that during the elastic deformation of stop element 16 a certain volume of intermediate space 53 remains maintained, because otherwise the pressure in intermediate space 53 is dismantled too quickly. When throttle gap 61, or squeeze gap 61, is closed, a part of the fluid volume is pressed out from intermediate space 53 via throttle gap 61. Here, a part of the volume can also be pressed out via guide gap 74. However, an increase in pressure in guide gap 74 acts perpendicular to valve axis 15, and as a rule is also compensated over the circumference.

Thus, when armature 6 impacts on stop element 16, from the beginning a high throttle effect is achieved via throttle gap 61, i.e. before the elastic deformation of stop element 16 occurs, so that a pressure increase occurs immediately in intermediate space 53. The pressure in intermediate space 53 can then increase as stop element 16 is increasingly over-expanded. The throttle effect achieved via throttle gap 61 then limits the maximum pressure that can be achieved, and, via the specification of the radial minimum length 75, enables, within practical limits, a certain compensation of the hydraulically acting brake force on armature 6 when the armature moves in direction 54.

Overall, in this way an adaptation is enabled with regard to a reduced hydraulic adhesion during opening and a hydraulic damping during closing.

The Figures are of course to be understood as schematic drawings in which the size relations, in particular angle of inclination 44 and height 73 of step 72, are shown in significantly exaggerated fashion relative to a preferred embodiment.

The present invention is not limited to the described exemplary embodiments.

What is claimed is:

1. A valve for metering a fluid, the valve being a fuel injection valve for an internal combustion engine, the valve comprising:
   an electromagnetic actuator; and
   a valve needle actuatable by the electromagnetic actuator, used to actuate a valve closing body that interacts with a valve seat surface to form a sealing seat, an armature of the electromagnetic actuator being guided on the valve needle so as to be movable along a longitudinal axis of the valve needle, the movement of the armature relative to the valve needle being limited by at least one stop surface, situated on the valve needle, of a stop element, the armature having at least one passage channel;
   wherein the stop element and/or the armature are configured such that during operation there always remains an intermediate space, adjoining the valve needle, between the stop element and an end face of the armature facing the stop element, and the stop surface lies, at least in a contact region, on the end face of the armature facing the stop element when the armature and the stop surface come into contact during operation, the contact region being situated between the intermediate space and an opening of the passage channel when the armature and the stop surface come into contact during operation, and
   wherein the stop element on which the stop surface is formed is connected to the valve needle or is formed on the valve needle, and the stop element is configured such that a fluid provided in the intermediate space is pressed out from the intermediate space during operation, at least partly via the throttle gap, due to a dynamic deformation of the stop element enabled by an impact of the armature on the stop surface.

2. The valve as recited in claim 1, wherein a projection of an edge of the stop surface into a plane of projection, through which the longitudinal axis passes in a perpendicular manner and at which the armature and the stop surface come into at least partial contact during operation, runs through a projection of the opening, facing the stop surface, of the passage channel into the plane of projection.

3. The valve as recited in claim 2, wherein the projection of the edge of the stop surface into the plane of projection runs through the projection of the opening, facing the stop surface, of the passage channel into the plane of projection so that the projection of the opening, facing the stop surface, of the passage channel into the plane of projection is divided into an inner partial surface situated on one side of the projection of the edge of the stop surface into the plane of projection and an outer partial surface situated on the other side of the projection of the edge of the stop surface into the plane of projection, and the armature and the stop surface are configured such that during operation at times a fluid exchange is enabled between the intermediate space and an inner space, from the intermediate space into the inner space or vice versa, via a throttle gap, the passage channel in the area of the opening, and at the outer partial surface, the throttle gap being formed between the contact region of the stop surface and the end face of the armature facing the stop surface.

4. The valve as recited in claim 1, wherein the edge of the stop surface is an outer edge of the stop surface.

5. The valve as recited in claim 1, wherein the stop surface is configured in one or more parts as a surface of a body that tapers along the longitudinal axis.

6. The valve as recited in claim 5, wherein the body tapering along the longitudinal axis is based on a cone or truncated cone.

7. The valve as recited in claim 1, wherein a surface that limits the intermediate space is configured on the stop element, which surface is oriented perpendicular to the longitudinal axis and limits the intermediate space, and a step is configured between the surface and the stop surface.

8. The valve as recited in claim 1, wherein the intermediate space is configured to be at least approximately rotationally symmetrical relative to the longitudinal axis of the valve needle.

9. The valve as recited in claim 2, wherein: (i) the end face of the armature facing the stop element lies in the plane of projection when the armature and the stop surface come into contact at the plane of projection during operation, and/or (ii) the stop surface and the passage channel are configured such that the inner partial surface is not larger than the outer partial surface.

* * * * *